3,679,645
FREE RADICAL PRECIPITATION POLYMERIZATION OF VINYL CARBAZOLE
Eugene V. Hort, Piscataway, N.J., assignor to GAF Corporation, New York, N.Y.
No Drawing. Filed Mar. 12, 1970, Ser. No. 19,073
Int. Cl. C08f 7/16
U.S. Cl. 260—88.3
11 Claims

ABSTRACT OF THE DISCLOSURE

A process is provided for obtaining particulate high molecular weight poly(vinyl carbazole) comprising charging (1) monomeric vinyl carbazole, (2) an inert organic solvent for said vinyl carbazole, said solvent being a nonsolvent for the resulting polymer, and (3) a catalytically effective amount of a free radical polymerization catalyst to a polymerization zone; heating the resulting mixture in said zone at a temperature ranging from about 45° C. to about 150° C. for a period of time sufficient to cause polymerization of said monomer and substantially simultaneous precipitation of discrete particles of poly(vinyl carbazole) forming a polymer slurry, and thereafter, recovering said polymer from said slurry.

---

This invention relates to the polymerization of vinyl carbazole. More particularly, this invention relates to the free radical polymerization of vinyl carbazole wherein the resulting polymer is obtained in particulate form and can be easily recovered.

Poly(vinyl carbazole) exhibits many unique and desirable properties which render the polymer useful in many fields, especially in electrical applications. The polymer provides abnormally high heat resistance for a vinyl type, thermoplastic polymer, exhibiting a softening temperature above 200° C. It has a very low power factor, a high dielectric strength and high volume and surface resistivities. Because of the relative immobility of the bulky carbazole side groups, the dielectric losses are quite low.

Although the mechanical properties of poly(vinyl carbazole) are relatively poor, the polymer has found great utility in the field of electronics where exacting mechanical requirements are not often encountered but where the demand is high for polymeric materials which exhibit good electrical properties and which retain these properties at high operating temperatures.

Despite the promising applications for poly(vinyl carbazole), the high manufacturing costs, lack of uniformity, poor color and commercial availability in generally unsuitable form, i.e., solid chunks or syrups, which have heretofore characterized the polymer have all contributed to its limited commercial acceptance and use.

The above-described disadvantages, i.e., high manufacturing costs, lack of uniformity, etc., are primarily attributable to the polymerization methods which have heretofore been employed in the manufacture of poly(vinyl carbazole). Although vinyl carbazole has been polymerized by a number of different techniques, the commercially available products are largely prepared by mass or solution polymerization methods.

In mass polymerization, the viscosity of the mass increases until solidification occurs. As a result, agitation of the mass to aid in heat removal and to maintain a uniform temperature within the reaction mass becomes increasingly difficult and eventually impossible. Consequently, the use of heavy, powerful and costly stirring equipment and elaborate cooling systems is usually necessary. Because of temperature gradient in the reaction mass, polymers are produced which may not be uniformly polymerized throughout the mass. In addition, it is difficult to carry a mass polymerization to completion. The polymerization is usually terminated prior to completion and the resulting polymer contains monomer which impairs its properties. Alternatively, the polymerization is allowed to proceed until nearly complete and the resulting solid, polymeric mass is broken up and the polymer fragments are washed to remove residual monomer and then dried. The extraction of residual monomer from such fragments is slow and difficult.

The other polymerization technique generally employed is solution polymerization wherein the monomer and resulting polymer are both soluble in the solvent employed. Here too, agitation problems arise because of the high viscosities of the resulting concentrated polymer solutions. Thus, heavy equipment similar to those required in mass polymerization may be necessary. Moreover, complete removal of the solvent from the polymer generally requires prolonged vacuum drying, and the solvent and unreacted monomer are very difficult to remove. To accomplish these things while avoiding discoloration and foreign matter in the polymer requires expensive engineering and equipment.

In addition, cationic catalysts, which are most frequently used for this polymerization, introduce ionic impurities which may be deleterious to electrical properties. Furthermore, such cationic polymerizations require low operating temperatures and rigid exclusion of moisture.

It would be considered highly desirable to provide an efficient and economic process for preparing high quality poly(vinyl carbazole) in an easily recoverable and usable form.

Accordingly, it is an object of the present invention to provide a process for the preparation of poly(vinyl carbazole) which will substantially overcome the above-noted deficiencies which have heretofore limited the acceptance and use of said polymer.

It is another object of this invention to provide an efficient and economic process for rapidly preparing high quality poly(vinyl carbazole) in high yields.

It is still another object of this invention to provide a process for preparing poly(vinyl carbazole) in discrete particulate form thereby simplifying the recovery and purification thereof and providing the polymer in readily usable form.

These as well as other objects are accomplished by the present invention which provides a process for the preparation of poly(vinyl carbazole) comprising charging (1) monomeric vinyl carbazole, (2) an inert, organic solvent for said vinyl carbazole, said solvent being a non-solvent for the resulting polymer and (3) a free radical polymerization catalyst to a polymerization zone; heating the resulting mixture in said zone at a temperature ranging from about 45° C. to about 150° C. for a period of time sufficient to cause polymerization of said monomer and substantially simultaneous precipitation of discrete particles of poly(vinyl carbazole) forming a polymer slurry, and thereafter recovering said polymer from said slurry.

Monomer grade N-vinyl carbazole is commercially available and can be generally obtained by addition of carbazole to acetylene, by dehydration of N-ethylol carbazole obtained by the reaction of potassium carbazole with ethylene oxide, by the reaction of potassium carbazole with vinyl chloride and other similar techniques. The monomer is a white solid melting at 65° C. Since the polymerization can be adversely affected by impurities, it is considered preferable to employ monomers of high purity.

The solvents employed in the present invention are inert, organic solvents which are in the liquid phase under reaction conditions and within which the vinyl carbazole monomer is soluble but the resulting poly(vinyl carbazole) is substantially insoluble and will precipitate therefrom as discrete particles. Solvents which are particularly useful in the present invention are alcohols, especially lower alkanols containing from 1 to about 6 carbon atoms such as methanol, ethanol, isopropanol, tert.-butanol, n-hexanol and the like, and aliphatic and alicyclic hydrocarbons containing at least about 5 carbon atoms and preferably from about 5 to about 10 carbon atoms such as hexane, cyclohexane, heptane, octane and the like.

The catalysts employed in the present invention are of the free radical type. Illustrative free radical catalysts are the organic peroxides such as lauroyl peroxide, benzoyl peroxide, t-butyl peroxypivalate, t-butyl hydroperoxide, di-t.-butyl peroxide, dibenzol diperoxide as well as other well known peroxide-type free radical polymerization catalysts; aliphatic azobisnitriles such as azobisisobutyronitrile and the like. The catalyst can be employed in catalytically effective amounts generally ranging from about 0.01 to about 5% by weight. The catalyst concentration is not considered critical and can vary depending upon the specific catalyst employed, the operating conditions and the desired molecular weight range of the polymer.

Although the concentration of monomer is not considered critical, it has been found in the present invention that when monomer concentration is too low the molecular weight, yield and rate of polymerization are adversely affected. Conversely, when monomer concentration is too high, the polymeric particles which form tend to agglomerate forming lumps which are difficult to wash and dry. The monomer concentration can vary from solvent to solvent; however, it is considered preferable to employ from about 10 to about 20 weight percent monomer. and most preferable, especially with an alcoholic solvent, from about 10 to about 2 0 weight percent monomer.

The polymerization reaction can be conducted at temperatures within the range of from about 45° C. to about 150° C. Most conveniently, the polymerization can be conducted at the reflux temperature of the particular solvent employed. The polymerization proceeds at atmospheric pressure, sub-atmospheric pressure and super-atmospheric pressures. It is considered preferable to conduct the polymerization in an inert atmosphere. Any inert gas, argon, nitrogen and the like can be employed to provide an inert blanket surrounding the reaction medium. The inert gas can conveniently be employed as a means of regulating pressure within the reaction system.

Since the polymer precipitates out of the reaction medium as discrete particles, it can be easily and conveniently recovered simply by filtering the discharged polymer slurry, washing the collected polymer and drying.

The process of the present invention can be conducted on a batch basis or continuously. On a continuous basis, the unreacted monomer and solvent can be recovered from the polymer slurry and then recycled.

In practicing the present invention, the monomeric vinyl carbazole can be dissolved in a solvent for said monomer, said solvent being a non-solvent for the polymer produced, and charged to the polymerization zone together with a catalytically effective amount of a free radical catalyst. The polymerization proceeds rapidly at temperatures where the catalyst decomposes to free radicals at a reasonable rate. The reflux temperature of the solvent is frequently convenient for running the polymerization as temperature control is facilitated. The polymerization can occur in a single reactor or in a series of reactors obtaining a desired conversion in each reactor of the train. If desired, additional increments of catalyst can be added during the polymerization. The resulting polymer slurry can be discharged from the reactor. Any unreacted monomer can be separated with the solvent from the slurry, as by filtration, and be recycled to the feed stream. The slurry can then be washed in a filter to purify the particulate polymer. The solvent filtrate can be purified, as by distillation, and recycled to the feed stream. The recovered particulate polymer can be redispersed in a wash medium such as hot alcohol, refiltered and then dried. The polymer thus obtained is white, finely-divided powder.

This process is particularly suitable for preparing ultrapure poly(vinyl carbazole) suitable for the most exacting electronic applications. If desired, extremely high molecular weights (weight average molecular weight from about 500,000 to about 1,000,000) can be obtained. In particular, a low content of monomer and other extractables (less than 1%) can readily be obtained because of the easily washed particles of polymer obtained in the process of the present invention. The polymers are colorless. They exhibit glass transition temperatures of about 220-225° C. and decompose above about 430° C. The high molecular weight polymers are very rigid and are good film formers.

The following specific examples illustrate the practice of the present invention. Unless otherwise stated, all percentages and parts are by weight.

EXAMPLE 1

A 500 milliliter 4-necked flask was fitted with an agitator, reflux condenser, thermometer and gas inlet tube. The flask was charged with 20.0 grams vinyl carbazole, 180 milliliters methanol and 0.10 gram azobisisobutyronitrile. Nitrogen was continuously fed to the flask during polymerization to maintain a nitrogen blanket therein. The mixture was heated to boiling (65°–66° C.) over a period of 15 minutes. All components of the charge had dissolved to give a clear solution by about 50° C. After about two minutes at reflux, the clear solution became hazy, and in another minute, discrete particles of polymer were observed precipitating out of solution. More discrete particles kept forming and a thick white slurry gradually developed. After 4 hours at reflux, the slurry was briefly cooled below boiling temperature, and an additional increment of 0.05 gram azobisisobutyronitrile was added. After a total of 8 hours at reflux, the slurry was filtered, and the white polymer was washed with hot methanol until drops of the wash gave no cloudiness when poured into an excess of water. The polymer was dried overnight at 92°–95° C. 19.8 grams (99% yield) of discrete white particles of poly(vinyl carbazole) were obtained exhibiting a relative viscosity (1% in benzene at 25° C.) of 1.93.

EXAMPLES 2–5

Employing the identical procedure described in Example 1 with the exception of the solvent employed, several additional polymerizations of vinyl carbazole were conducted at 65–66° C., each with a different solvent for the monomer which was a non-solvent for the polymer. The results obtained are summarized in Table I below. In each example, the polymer was obtained as discrete white particles.

TABLE I

| Solvent | Induction period (minutes)* | Yield (percent) | Relative viscosity (1% benzene, 25° C.) |
|---|---|---|---|
| Example: | | | |
| 2 ........... Ethanol ......... | 24 | 98.5 | 1.47 |
| 3 ........... Isopropanol ..... | 26 | 96 | 1.35 |
| 4 ........... t-Butanol ....... | 5 | 98.5 | 1.83 |
| 5 ........... Cyclohexane .... | 20 | 95.5 | 1.56 |

*Induction period: Time until discrete particles of polymer first appeared.

EXAMPLE 6

This example illustrates the difficulties encountered through use of solution polymerization techniques wherein the solvent employed is a solvent for both monomer and polymer, thereby providing a polymer syrup as compared to a polymer slurry.

Employing the same apparatus described in Example 1, 20.0 grams of vinyl carbazole, 180 milliliters benzene and 0.10 gram azobisisobutyronitrile were charged to the reaction vessel. The clear solution was heated at 65°–66° C. and gradually became slightly hazy and more and more viscous. After 4 hours, an additional 0.05 gram increment of azobisisobutyronitrile was added and the solution stirred for an overall total of 8 hours at 65°–66° C.

The resulting polymer syrup was discharged into an aluminum foil-lined evaporating dish. The reaction vessel was rinsed with several small portions of benzene, and the washings were combined with the polymer syrup. The dish was placed in a vacuum oven and dried at 100° C. Periodically, the dish was removed from the oven, and the skin which had formed on the syrup was broken up. After 18 hours, the dried product (22.7 grams) was removed from the oven, and ground with methanol in a mortar and pestle. After filtering and washing with additional methanol, the product was dried for 24 hours at 100° C. The resulting poly(vinyl carbazole) (21.0 grams) appeared as pale amber jagged rosin-like flakes which exhibited a relative viscosity (1% in benzene at 25° C.) of 1.41.

EXAMPLES 7–9

In the following examples, the procedure described in Example 1 was followed using differing amounts of methanol as solvents to determine the effect of monomer concentration. In all the following examples, 0.010 gram (0.05%) of azobisisobutyronitrile was added at the start and 0.005 gram (0.025%) was added after 4 hours. The results obtained are summarized in Table II below.

TABLE II

| Example: | Monomer concentration (percent) | Yield (percent) | Relative viscosity (1% in benzene, 25° C.) |
|---|---|---|---|
| 7 | 11.2 | 96 | 2.25 |
| 8 | 13.7 | 95 | 2.32 |
| 9 | 17.4 | 95 | *2.45 |

*In this example, the polymer particles tended to agglomerate. A benzene solution contained traces of insolubles.

EXAMPLE 10

Employing the procedure described in Example 1, 0.25% of t-butyl peroxypivalate was employed as catalyst in lieu of the azobisisobutyronitrile. A 93% yield of discrete white particles of poly(vinyl carbazole) was obtained exhibiting a relative viscosity (1% in benzene at 25° C.) of 1.80.

EXAMPLE 11

Employing substantially the same procedure as described in Example 1, t-butyl alcohol was employed in lieu of methanol as solvent. The polymerization medium was brought to reflux at 84° C. Lauroyl peroxide in an amount of 1.0% was continually added as catalyst in place of azobisisobutyronitrile, and after 2 hours an additional increment of 0.5% of catalyst was added. Particles of polymer started to appear even before the reaction temperature was reached. After a total of 4 hours at reflux, the polymer was filtered, washed and dried as in Example 1. 16.5 grams (82.5% yield) of white, finely-divided particles of poly(vinyl carbazole) were obtained exhibiting a relative viscosity (1% in benzene at 25° C.) of 1.35.

While several specific embodiments of the present invention have been described in detail, it will be understood that the present invention is not limited to these specific examples and that various modifications may be made therein, as heretofore indicated, without departing from the spirit of this invention or the scope of the appended claims.

What is claimed is:

1. A process for the preparation of poly(vinyl carbazole) comprising charging (1) monomeric vinyl carbazole, (2) an inert organic solvent for said vinyl carbazole, said solvent being a non-solvent for the resulting polymer, and is a member selected from the group consisting of alcohols containing from 1 to about 6 carbon atoms and aliphatic and alicyclic hydrocarbons containing from about 5 to about 10 carbon atoms, and (3) a catalytically effective amount of a free radical polymerization catalyst to a polymerization zone; heating the resulting mixture in said zone at a temperature ranging from about 45° C. to about 150° C. for a period of time sufficient to cause polymerization of said monomer and substantially simultaneous precipitation of discrete particles of poly(vinyl carbazole) forming a polymer slurry, and thereafter, recovering said polymer from said slurry.

2. A process according to claim 1 wherein the solvent is an alcohol containing from 1 to about 6 carbon atoms.

3. A process according to claim 2 wherein the solvent is methanol.

4. A process according to claim 1 wherein the free radical catalyst is a member selected from the group consisting of organic peroxides and aliphatic azobisnitriles.

5. A process according to claim 1 wherein the free radical catalyst is present in amounts ranging from about 0.01 to about 5% by weight.

6. A process according to claim 1 wherein the monomer is present in amounts ranging from about 5 to about 40% by weight.

7. A process according to claim 6 wherein the monomer is present in amounts ranging from about 10 to about 20% by weight.

8. A process according to claim 1 wherein the polymerization reaction is conducted in an inert atmosphere.

9. A process according to claim 1 wherein the polymer is recovered by filtering the polymer slurry, washing the collected polymer and drying said polymer.

10. A process according to claim 1 conducted on a continuous basis wherein the unreacted monomer and solvent are separated from the polymer slurry and recycled to the polymerization zone.

11. A process according to claim 1 wherein the catalyst is added in increments during polymerization.

References Cited

UNITED STATES PATENTS

| 2,953,546 | 9/1960 | Thomas et al. | 260—88.3 R |
| 3,208,984 | 9/1965 | Dekking | 260—88.3 R |
| 2,728,770 | 12/1955 | Mahan | 260—88.3 R |
| 3,073,808 | 1/1963 | Mertz | 260—88.3 R |
| 2,072,465 | 3/1937 | Reppe et al. | 260—88.3 R |
| 2,877,216 | 3/1959 | Fikentscher et al. | 260—88.3 R |
| 3,336,279 | 8/1967 | Scott | 260—88.3 R |

HARRY WONG, JR., Primary Examiner